R. C. POPE.
STREET ROLLER.
No. 11,347. Reissued June 27, 1893.
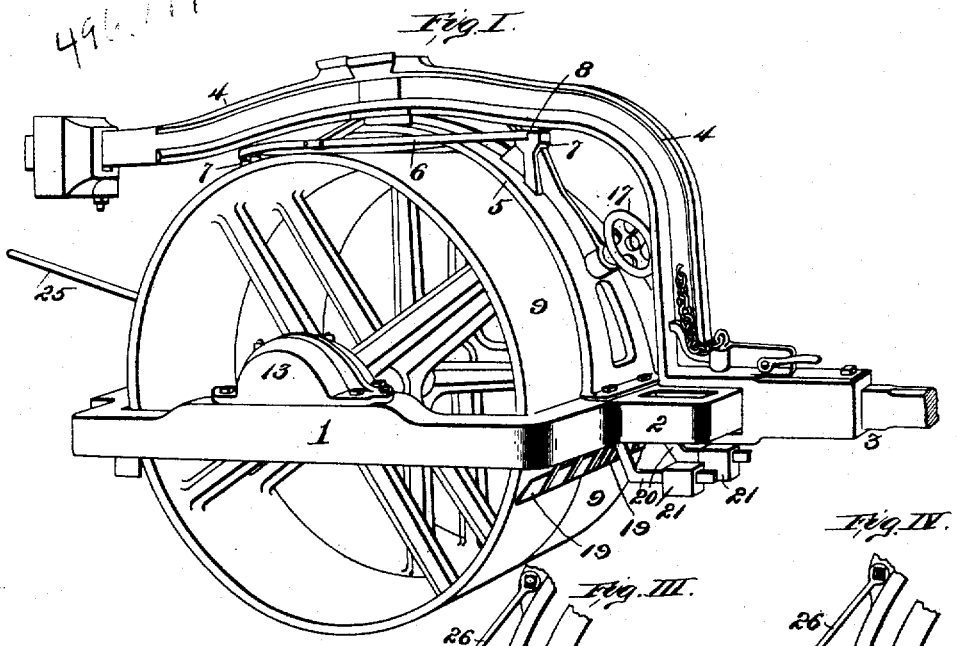
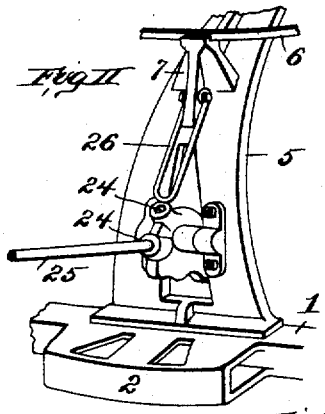
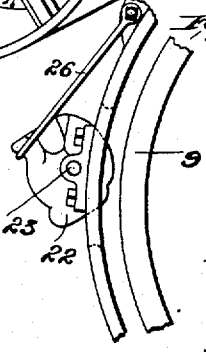
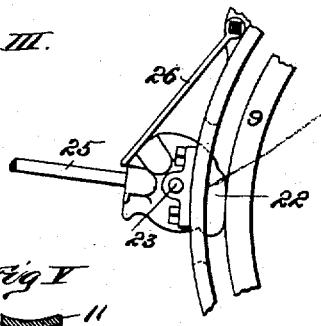
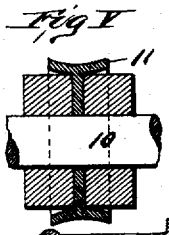
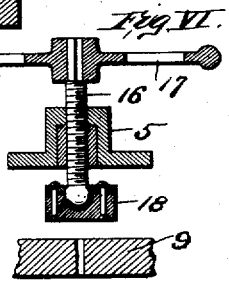
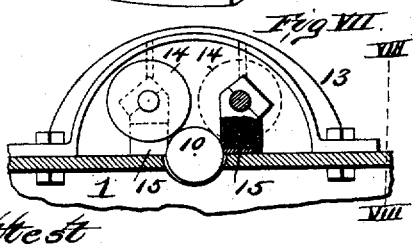
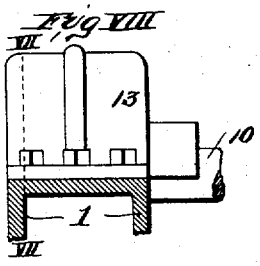
Attest
A. M. Ebersole
Inventor:
Richard C. Pope
By Wright & Ford
Attys

UNITED STATES PATENT OFFICE.

RICHARD C. POPE, OF ST. LOUIS, MISSOURI, ASSIGNOR TO EDWARD I. POPE, OF MORELAND, ILLINOIS.

STREET-ROLLER.

SPECIFICATION forming part of Reissued Letters Patent No. 11,347, dated June 27, 1893.

Original No. 496,794, dated May 2, 1893. Application for reissue filed May 17, 1893. Serial No. 474,566.

*To all whom it may concern:*

Be it known that I, RICHARD C. POPE, of the city of St. Louis, in the State of Missouri, have invented a certain new and useful Improvement in Street-Rollers, of which the following is a full, clear, and exact description, reference being had to the accompanying drawings, forming part of this specification.

My invention relates to certain improvements in that form of roller shown and described in United States Letters Patent No. 296,446, issued to me as the assignee of Charles K. Pickles, dated April 8, 1884.

My invention consists in features of novelty hereinafter fully described and pointed out in the claims.

Figure I is a perspective view of my improved street roller, illustrative of my invention. Fig. II is a detail, perspective view, illustrating the brake mechanism. Figs. III and IV are detail side views of same. Fig. V is a detail axial section, showing the dirt guard. Fig. VI is a detail section, transverse of the arch illustrating the clamp for holding the frame rigid on the rolls while turning the tongue. Fig. VII is a detail, vertical section, showing one of the anti-friction roller bearings for the journals of the rolls; the section is taken on line VII—VII, Fig. VIII. Fig. VIII is a section taken on line VIII—VIII, Fig. VII.

Referring to the drawings, 1 represents a rectangular frame having heads 2, one head being located on each side, substantially the same as in the patent referred to.

3 represents the draft tongue, and 4 a swinging frame or beam pivoted to an arch 5, which spans the rolls, and is secured at its lower ends to the frame 1. These parts in themselves are the same as the corresponding parts in the patent mentioned, and act the same, requiring no further description or explanation here.

6 represents a circle iron or track secured to the arch 5 by brackets 7.

8 represents friction rollers journaled to the beam or frame 4, and which bear upon the track 6 and move thereon as the draft tongue is being swung around from side to side of the roller, thus relieving the pivot of the beam or frame 4 from strain and providing a very easy movement of the beam or frame, as it is swung around.

9 represents the roll or rolls. I have shown two. They are mounted on an axle or spindle 10, with a concave guard or ring 11 between them, as shown in Fig. V, the object of the guard being to prevent dirt and dust, which may fall from the rolls, from reaching the journals of the rolls on the axle or spindle 10. The ends of the axle or spindle are journaled in the frame 8, and turn therein, when the roller is being moved in other than a straight course, and then also, if it is desired to secure the rolls rigidly to the axle or spindle.

To reduce the friction between the frame 1 and the axle or spindle, I employ housings 13, in which are located anti-friction rollers 14, (see Figs. VII and VIII;) the anti-friction rollers are journaled in suitable boxes 14ª, shown by dotted lines in Fig. VII.

15 are springs supporting the lubricating waste against the journals of the rollers. It will thus be seen that the journal ends of the axle or spindle receive the entire weight of the frame 1, through the medium of the anti-friction rollers 14, thus reducing the frictional contact.

When the draft tongue 3 is to be swung around from side to side of the roller, it is desirable to clamp the frame 1 so that it will not move on its bearing with the journals of the axle 10. I accomplish this by means of a threaded rod 16, which passes through the arch 5, (see Figs. I and VI,) and which is provided with a hand-wheel 17 on its outer end by which it may be turned, and a block or shoe 18 on its inner end which is adapted to be forced against the rolls 9, and thus hold the frame 1 from movement relative to the rolls while the tongue is being swung around.

19 represents scrapers pivoted to the frame 1, and having extensions 20, provided with counter-balance weights 21 for regulating the pressure of the scrapers against the rolls; the object of these scrapers is to keep the rolls free of dirt.

In going down grades, it is desirable to have a brake on the roller. This I provide in the form of an eccentric 22, pivoted to the arch 5 at 23, (see Figs. II, III and IV.) This eccentric is provided with a number of perforations 24 to receive a rod or bar 25 by which the eccentric may be moved to bring its inner face against the rolls, as shown in Fig. IV, and thus apply the brake, or the eccentric may be moved out of contact with the rolls, and held out of contact by means of a link 26, (see Fig. III).

I claim as my invention—

1. In a street roller, the combination of a frame, a roll journaled in the frame, an arch secured to the frame, a circle iron or track the brackets by which the circle iron or track is secured to the arch, a beam or swinging frame pivoted to the arch, and to which the draft tongue is secured, and friction rollers secured to the beam or swinging frame, and which bear upon said track; substantially as and for the purpose set forth.

2. In a street roller, the combination of a frame, two or more rolls journaled in the frame on an axle or spindle, and a concave guard 11 placed between the rolls; substantially as and for the purpose set forth.

3. In a street roller, the combination of a frame, a roll journaled in the frame, an arch secured to the frame, a beam pivoted to the arch and to which the draft tongue is secured, and a device for holding the frame from moving on the roll as said beam is moved on its pivot; said device consisting of a threaded rod passing through said arch, a hand-wheel on the outer end of the rod, and a block or shoe on the inner end of the rod; substantially as and for the purpose set forth.

4. In a street roller, the combination of a roller, a frame, a draft tongue adapted to be swung around to either side of said roller, and a device for holding the frame from oscillating on the roller, while the tongue is being swung around, substantially as shown and described.

5. In a street roller, the combination of a roller, a frame, a draft tongue adapted to be swung around to either side of said roller, and a device for holding the frame from oscillating on the roller while the tongue is being swung around; said device consisting of a shoe and a screw for moving the shoe; substantially as shown and described.

6. In a street roller, the combination of a frame, a roll journaled in the frame, an arch secured to the frame, and a brake consisting of an eccentric secured to said arch, a rod for moving the eccentric into contact with the roll, and a link for holding the eccentric out of contact with the roll; substantially as and for the purpose set forth.

RICHARD C. POPE.

In presence of—
A. M. EBERSOLE,
E. S. KNIGHT.